United States Patent [19]

Ogle et al.

[11] Patent Number: 4,462,755
[45] Date of Patent: Jul. 31, 1984

[54] ANVIL-STRAP ROTOR

[75] Inventors: Peter C. Ogle, Woodbridge; Edward S. Hibyan, Trumbull, both of Conn.

[73] Assignee: The United States of America as represented by the Secretary of the Navy, Washington, D.C.

[21] Appl. No.: 295,405

[22] Filed: Aug. 24, 1981

[51] Int. Cl.³ .............................................. B64C 27/38
[52] U.S. Cl. ............................ 416/132 R; 416/134 A; 416/230
[58] Field of Search ............ 416/134 A, 230 A, 132 R

[56] References Cited

U.S. PATENT DOCUMENTS

| | | | |
|---|---|---|---|
| 1,851,098 | 3/1932 | Hermanson | 416/132 |
| 2,917,274 | 12/1959 | Davidson | 416/230 |
| 3,706,511 | 12/1972 | Abbott | 416/229 |
| 4,037,990 | 7/1977 | Harris | 416/220 R |
| 4,047,839 | 9/1977 | Ferris et al. | 416/134 A |
| 4,051,289 | 9/1977 | Adamson | 428/113 |
| 4,137,007 | 1/1979 | Schönball | 416/229 R |
| 4,255,478 | 3/1981 | Crane | 428/113 |
| 4,323,332 | 4/1982 | Fradenburgh | 416/134 A |
| 4,349,317 | 9/1982 | Desjardins | 416/134 A |
| 4,369,018 | 1/1983 | Brunsch et al. | 416/134 A |

FOREIGN PATENT DOCUMENTS 1252011 10/1967 Fed. Rep. of Germany ... 416/134 A

OTHER PUBLICATIONS

Report No. SER 13429 of Sikorsky Aircraft Division of the United Technologies Corporation dated Aug. 28, 1980, and in particular pp. 83, 84, 86, 112 and Figures 51 and 52 of said report.

Primary Examiner—Everette A. Powell, Jr.
Attorney, Agent, or Firm—Robert E. Beers; Kenneth E. Walden; Frederick A. Wein

[57] ABSTRACT

An aerodynamic rotor having a flexible blade comprising a plurality of planar layers and an anvil having configured bearing areas engagable with the flexed blade is presented. The plurality of layers are slidably movable in a shearing motion with respect to other layers. The blade is secured by the anvil with the configured bearing areas being engagable with an adjacent portion of the blade when the blade is flexed by forces created by the driven rotory motion of the anvil about an axis of rotation. Such a rotor with a laminated blade exhibits reduced head moment forces and reduced stress/strain forces within the blade thereby permitting improved reliability and maintenance.

11 Claims, 3 Drawing Figures

ANVIL-STRAP ROTOR

BACKGROUND OF THE INVENTION

The present invention relates to aerodynamic rotors and, more particularly, to the tail rotor and blade of a helicopter.

Aerodynamic rotors of the kind of interest for helicopters are comprised of a rotatably driven anvil and an aerodynamic blade. When such rotors are driven under load, the blades are subjected to substantial stress caused by flat-wise loading which results in a substantial increase in the head moment of the driven anvil and in the blade material.

In particular, with respect to tail rotors of helicopters, for simplicity of construction, increased reliability, and reduced maintenance cost, it is desirable that a non-articulated blade be clamped between two hub plates forming an anvil with the blade acting as a cantilevered beam upon flat-wise flapping or bending due to flat-wise flexure forces generated under load. However, such a construction would result in an increase in the head moments of the anvil of approximately three times greater than those of semi-articulated rotors which are commonly used. Such higher head moments would necessitate redesign of the tail gear output shaft, tail gear box support fitting, major components of the tail gear box and possibly the tail pylon structure. Accordingly, it is desirable to avoid such a major redesign and increased weight.

In order to reduce the increased stresses which result, prior anvil designs were provided with configured bearing areas engagable by the blade during flapping for permitting sufficient bearing support of the blade at the hub while permitting some movement of the blade in the hub area for reducing the high hub moment which results. However, even in this case, severe stress/strain is produced within the blade and there still are severe fatique life limitations on the blade and rotor head with the requirement for heavier hub components having undesirable excess weight.

Accordingly, it is desirable to provide an aerodynamic rotor having improved reliability and maintenance with reduced internal blade stress/strain and reduced head moment forces generated during flat-wise loading of the rotor.

SUMMARY OF THE INVENTION

Briefly, the present invnetion relates to an aerodynamic rotor having a flexible blade comprising an plurality of planar layers and an anvil having configured bearing areas engagable with the flexable blade. The plurality of layers are slidably movable in a shearing motion with respect to other layers upon the application of flatwise flexure forces acting upon the blade. The blade is held at the anvil with the configured bearing areas being engagable with an adjacent portion of the blade when the blade is flexed for forces created by the driven rotary motion of the anvil about an axis of rotation.

In one embodiment the layers of the rotor blade are tightly clamped at the anvil with the unclamped portions including the distal ends of the layers being free to slide with respect to other layers. In another embodiment, the layers of the rotor blade are control clamped at the anvil and are free to slide in the clamped area with respect to each other. In this embodiment the ends of the layers are secured together to prevent sliding movement between the layers at the ends. In either of the foregoing embodiments, a sliding movement facilitating material can be included to facilitate the sliding motion between layers. Such facilitating material can be a lubricating material such as a viscous fluid, powder, a layer of a lubricating elastomer, or the like. Alternatively, the sliding movement facilitating material can be a layer of resilient rubber secured to the respective adjacent surfaces of the adjacent layers and resiliently derformable upon sliding movement between adjacent layers.

OBJECTS OF THE INVENTION

Accordingly, it is an object of the present invention to provide an aerodynamic rotor blade comprising a plurality of planar layers which are slidably engaged with adjacent layers so that the layers are slidingly movable in a shearing motion with respect to other layers upon application of flatwise flexure forces acting upon the blade.

Another object of the present invention is to provide an aerodynamic rotor having a blade according to the above object and an anvil having configured bearing areas engagable by proximate portions of the blade with the blade being secured to an anvil and flexibly movable for engagement with the configured bearing area of the anvil upon being rotably driven. A further object of the present invention is to provide an aerodynamic rotor having a blade having a plurality of laminated layers with each of the layers being slidingly movable against adjacent layers, and a sliding movement facilitating material disposed between the adjacent layers such that the sliding movement by shear motion of the laminated layers with respect to each other is facilitated by the facilitating material.

Further objects and advantages of the present invention will become apparent as the following description proceeds and the features of novelty characterizing the invention will be pointed out with particularity in the claims annexed to and forming a part of this specification.

DESCRIPTION OF THE DRAWINGS

For a better understanding of the present invention reference may be had to the accompanying drawings wherein.

DETAILED DESCRIPTION OF THE PREFERRED EMBODIMENT

The anvil hub of the present invention permits reduced stress flapping freedom of the rotor blade under load. The blade is structured of laminated strap or layer members which are made up of stacks of unidirectional composite material layed up with appropriate fiber orientation to provide flat-wise flexibility, torsional flexibility, and edgewise stiffness. In one embodiment of the present invention, the composite layers are interleaved with layers of material for facilitation of the composite layers to slip or move relative to each other during flexure such that the laminate layers do not appreciably change in length and thus sustain no appreciable vibratory or elongation stress/strain due to flapping flexure. The anvil hub is configured with bearing radius areas to control the amount of curvature of the laminate to minimize the stress/strain level of the layers during flexure.

Figure 1:
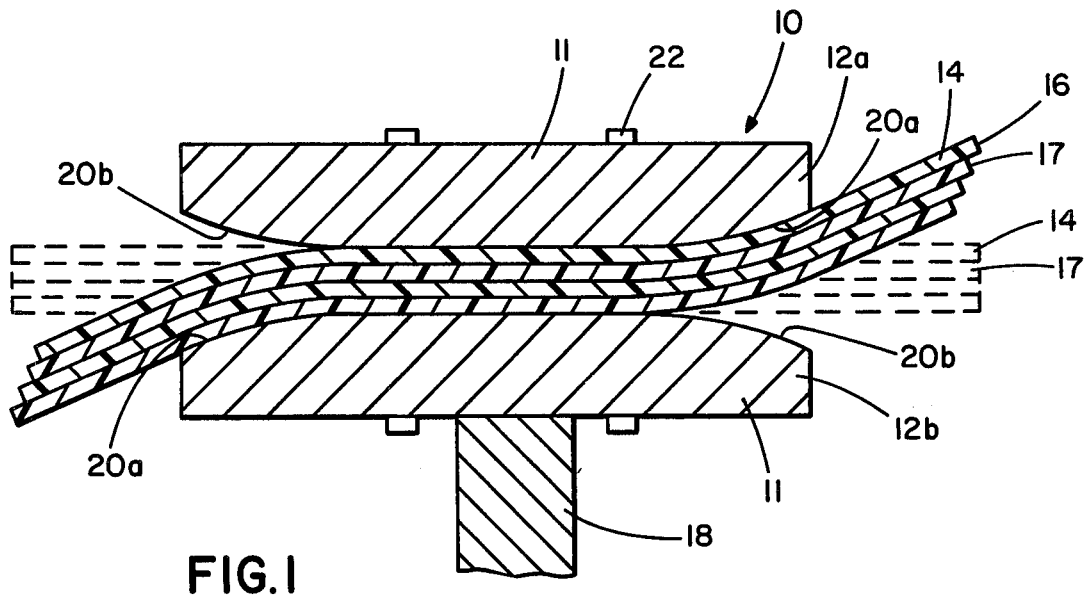
FIG. 1 shows, in cross section, a representation of a first embodiment of an anvil-strap rotor of the present invention.

More particularly, referring now to the figures wherein like parts have been given like numerals, there is shown in FIG. 1 a representation of an anvil strap rotor, generally designated 10, which includes an anvil 11 having a pair of hub assemblies 12a,b which secure an rotor blade 14 which comprises a plurality of straps or layers 16. The layers 16 are generally planar and are disposed in a plane generally parallel to the adjacent layers. The outside surfaces of the respective layers are in slidable engagement with the respective adjacent outside surface of an adjacent layer. The hub assemblies 12a,b are secured to each other and to rotor shaft 18 for being rotably power driven by shaft 18. In a static condition, the blade 16 extends straight out in mid-position between configured portions 20a,b as shown in phantom in FIG. 1 with the layer ends 17 being in line with each other. Upon rotation, the layers 16 are acted upon by generated flexure forces which flex the blade 14 normal to the plane of the layers against the configured bearing areas 20a,b of the respective hub assemblies 12a,b with the layers slidably moving in a slipping shear motion with respect to each other.

In the embodiment shown in FIG. 1, the layers 16 are tightly secured by a clamping of hubs 12a,b so that sliding movement between the layers 16 is prohibited in the clamping area at the anvil 11. Portions of the layers outside of the clamping area are free to slide with respect to each other.

As the blade 14 is rotatably driven, flexure forces are generated such that the blade 14 forms and "S" shape in the anvil area as shown in FIG. 1. Upon rotation in one direction, the blade 14 will flex due to the flatwise flexure forces acting upon the blade to drive portions of the blade into engagement with configured bearing areas 20a of hub assemblies 12a,b as shown. If the rotor direction of rotation is reversed, then the blade 14 will be driven against corresponding opposite bearing areas 20b.

This bending, flexing, or flapping of the rotor blades 14 causes the straps to form a deck of cards or imbricated configuration at their ends. Since the straps are secured at the anvil, the flexure forces cause equal end deflection of the straps as shown in FIG. 1. The ability of the layers 16 to move in a shearing motion relative to each other when subjected to such flexure forces results in greatly decreased stress/strain forces within the rotor blade 14.

The hub 11 comprises of a three piece titanium forging with the configured bearing areas 20 being machined to a sixteenth inch radius. This radius is determined by the strap thickness and material. The radius of the configured bearing area 20 is chosen, depending upon the strap material, thickness, and other mechanical and dimensional characteristics of the blade and material, to minimize the stress/strain within the rotor at the head and in the blade. For example, if the layers 16 are thinner, then the radius of the configured bearing areas 20 can be made smaller thereby increasing the curvature of the respective configured bearing area 20.

Any blade configuration extending from the anvil 11 must be balanced such that the blade extensions are equal and diametrically opposed. In the exemplary embodiment, the blade 14 can be a single blade secured at mid-position or it can be comprised of a plurality of blade portions clamped at the anvil in a diametrically opposed balanced configuration. Multiple blades can be used, such as four single blades extending outwardly at 90° increments or two blades held at mid-position by the anvil 11 with the blades 14 perpendicularly crossing each other. In the embodiment shown, the shaft 18 is connected to drive hub 12b, however, it is within the contemplation of the presentation invention that the shaft 18 can pass through the blade or blades 14 and hub 12a.

Figure 2:
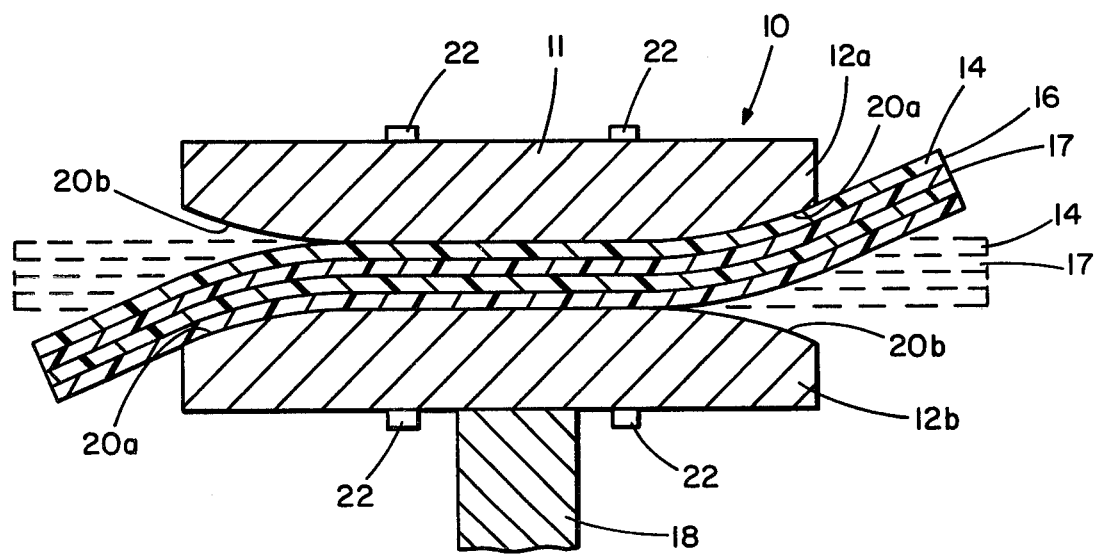
FIG. 2 shows, in cross section, a representation of a second embodiment of an anvil-strap rotor of the present invention.

Referring now to FIG. 2 there is shown an alternative embodiment of the rotor of FIG. 1 wherein the layer ends 17 are secured to each other for preventing movement of the layers 16 at the ends 17. In this embodiment, the anvil 11 provides a controlled clamp for the blade 14 such that although the blade 14 is constrained to rotate with the anvil 11 however, the layers 16 are permitted to slidingly move with respect to each other through the hub area. Thus, as the blade 14 is rotated, it is flexed from the static position shown in phantom in FIG. 2 into the "S" configuration bearing against appropriate configured areas 20 depending upon the direction of rotation of the shaft 18 as disclosed above in connection with FIG. 1.

The blade 14 can be constrained to rotate with the anvil 11 by means of longitudinal slots (not shown) in the blade 14 through which anvil bolts 22 can be passed but with a controlled clamping pressure so that the layers 16 of the blade 14 can slide longitudinally with respect to the bolts 22 disposed along the slots. In either of the embodiments shown in FIGS. 1 and 2, the total length of the individual layers remains substantially the same in both the static and driven conditions.

Figure 3:
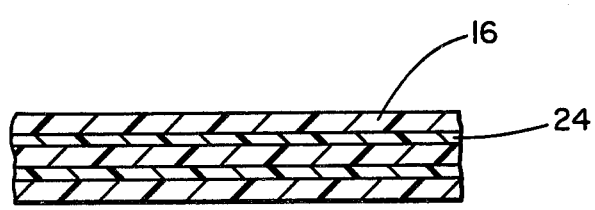
FIG. 3 shows in fragmentary cross section, on an enlarged scale, an alternate structure of the rotor blade.

Referring now to FIG. 3, there is shown still another embodiment of the present invention wherein a sliding movement facilitating material 22 is disposed between adjacent layers of the blades 14 of FIGS. 1 and 2. Each of the straps 16 are separated from adjacent straps 16 by the material 22 which can comprise an elastomer having lubricating qualities, such as nylon. This lubricating material can comprise a ply separate from the adjacent layers 16 between which it is sandwiched or it can be bonded to one of the outer surfaces of an adjacent layer 16 to slide against the other adjacent layer. Additionally, this lubricating material 22 can be comprised of a layer of lubricating material other than an elastomer or it can be other than a layer or ply of material, e.g. a powder such as graphite, a fluorocarbon resin such as TEFLON TM, or the like embedded in or disposed at the outer surface of the layer 16, or a suitable viscous fluid, provided that suitable precautions against loss of such powdered or fluidal lubricating material 22 are taken.

In an alternate embodiment of FIG. 3, the sliding movement facilitating material 22 can comprise a layer of elastic resilient material such as rubber which is vulcanized to both the proximate outside surfaces of the adjacent layers 16 between which the layer of resilient material is sandwiched. In this embodiment, when the layers 16 slidingly move as in the embodiments of FIGS. 1 or 2, the resilient rubber deforms and elastically stretches according to the sliding movement and returns to the original configuration upon removal of the flexure forces. This construction has the advantage of providing a more cohesive construction for the blades.

In the exemplary embodiment, the rotor blade 14 comprises 10 straps or layers 16 each being 0.040 inches thick of 0°/±45° high strength S-glass straps. The layers are built up unidirectional S-glass plies (not shown) in order to obtain increased joint strength for fastening to a torque tube with each strap comprising eight 0.005 inch thick high strength S-glass plies arranged in a 0/+45/0/−45/45/0/+45/0° orientation which make up one layer.

The blade 14 is enclosed in a filament wound torque tube (not shown) composed of ±15/±45° graphite which is fastened outboard of the layers and is constrained at a hinge offset by an elastomeric pivot assembly (not shown). Pitch change is accomplished by change of the torque tube orientation through a pitch control assembly in a manner known in the art.

Thus, there is shown an anvil strap-rotor having reduced stress/strain forces generated within the blade during flexure. The rotor blade comprises a plurality of layers which are slidable in a shear motion with respect to other layers. A sliding movement facilitating material, e.g. lubricating material such as nylon, can be disposed between adjacent layers for lubricating the sliding movement therebetween. The hub is provided with configured bearing areas having a radius chosen for reducing stress within the rotor blade upon flexure. Upon being rotatably driven by the rotor shaft, flexure forces act upon the blade and flex the blade normal to the plane of the layers against configured bearing areas of the anvil appropriate to the direction of rotation of the rotor. The sliding movement between layers permits a substantial reduction of strains/stress forces with the blade and in the anvil during flexure or flapping.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed as new and desired to be secured by Letters Patent is:

1. An aerodynamic rotor blade comprising a plurality of planar layers each of the layers having diametrically opposed planar surfaces, the planar layers being disposed in respective parallel planes with the respective outer planar surfaces being in slidable engagement with the corresponding outer planar surfaces of adjacent layers, the planar layers being slidably movable in a shearing motion with respect to the other layers upon the application of flexure forces acting upon the blade.

2. An aerodynamic rotor comprising:
a blade comprising a plurality of planar layers each of the layers having diametrically opposed planar surfaces, the planar layers being disposed in respective parallel planes with the respective outer planar surfaces being in slidable engagement with the corresponding outer planar surfaces of adjacent layers, the planar layers being slidably movable in a shearing motion with respect to the other layers upon the application of flexure forces acting upon the blade, and
an anvil having an axis of rotation and comprising a first and second anvil portion, each of the first and second anvil portion having a configured bearing areas engagable with an outside surface portion of the blade, the blade being constrained at the anvil between the first and second anvil portions for rotatable movement with the anvil with the blade being flexibly movable for engagement of the surface portion with some of the configured bearing areas upon the anvil being rotatably driven about the axis of rotation.

3. The rotor of claim 2 wherein the blade comprises at least two portions, each blade portion being secured at the anvil and extending in diametrically opposite directions from the anvil.

4. The rotor of claim 2 wherein the blade comprises a unitary structure constrained at mid-position at the anvil and extending in a diamterically opposite directions from the anvil.

5. The rotor of claims 3 or 4 wherein the layers have a clamped portion where the layers are tightly secured to each other at the anvil for preventing slidable movement between the layers in the clamped portion proximate the anvil, the other portions of the layers outside the clamped portion being free to slidably move with respect to each other upon application of flexure forces to the blade.

6. The rotor of claim 4 wherein the ends of the layers distal of the anvil are tightly secured to each other for preventing slidable movement between the layers at the ends and the anvil secures the blade at mid-position in a controlled clamp for permitting slidable movement between the layers of the blade through the clamping area upon application of flexure forces to the blade.

7. The devices of claims 1, 2, 4, or 6 wherein the blade further comprises a lubricant means disposed between adjacent layers for lubricating the slidable movement between the adjacent layers.

8. The devices of claims 1, 2, 4 or 6 wherein the blade further comprises a resilient means disposed between adjacent layers, said resilient means being secured to proximal outer surfaces of said adjacent layers and being resiliently deformable upon sliding movement between the adjacent layers.

9. An aerodynamic rotor comprising:
a blade comprising a plurality of planar layers each of the layers having diametrically opposed planar surfaces, the planar layers being disposed in respective parallel planes with the respective outer planar surfaces being in slidable engagement with the corresponding outer planar surfaces of adjacent layers, the planar layers being slidably movable in a shearing motion with respect to other layers upon the application of flexure forces acting upon the blade,
an anvil having an axis of rotation and comprising a first and second anvil portion, each of the first and second anvil portion having a configured bearing areas engagable with an outside surface portion of the blade, the blade being secured at the anvil between the first and second anvil portions for rotatable movement with the anvil, with the blade being flexibly movable for engagement of the surface portion with some of the configured bearing areas upon the anvil being rotatably driven about the axis of rotation,
the layers of each blade being secured to each other at the anvil for preventing slidable movement between the layers in the portion of the layers proximate the anvil, the unsecured portions of the layers distal of the anvil being free to slidably move with respect to each other upon application of flexure forces to the blade, and a slidable movement facilitating means disposed between adjacent layers for facilitating the slidable movement between the adjacent layers upon the application of flexure forces to the blade.

10. An aerodynamic rotor comprising:

a blade comprising a plurality of planar layers each of the layers having diametrically opposed planar surfaces, the planar layers being disposed in respective parallel planes with the respective outer planar surfaces being in slidable engagement with the corresponding outer planar surfaces of adjacent layers, the planar layers being slidingly movable in a shearing motion with respect to the other layers upon the application of flexure forces acting upon the blade, an anvil having an axis of rotation and comprising a first and second anvil portion, each of the first and second anvil portion having a configured bearing areas engagable with an outside surface portion of the blade, the blade being constrained at the anvil between the first and second anvil portions for rotatable movement with the anvil, with the blade being flexibly movable for engagement of the surface portion with some of the configured bearing areas upon the anvil being rotatably driven about the axis of rotation, the blade comprising a unitary structure constrained at mid-position at the anvil and extending in diametrically opposite directions from the anvil, the ends of the layers distal of the anvil being tightly secured to each other for preventing slidable movement between the layers at the ends, the anvil constraining the blade at mid-position in a controlled clamp for permitting slidable movement between the layers of the blade through the clamping area upon application of flexible forces to the blade, and a slidable movement facilitating means disposed between adjacent layers for facilitating the slidable movement between the adjacent layers upon the application of flexure forces to the blade.

11. An aerodynamic rotor comprising:

a blade comprising a plurality of planar layers each of the layers having diametrically opposed planar surfaces, the planar layers being disposed in respective parallel planes with the respective outer planar surfaces being in slidable engagement with the corresponding outer planar surfaces of adjacent layers, the planar layers being slidably movable in a shearing motion with respect to the other layers upon the application of flexure forces acting upon the blade, and an anvil having an axis of rotation and comprising a first and second anvil portion, each of the first and second anvil portion having a configured bearing areas engagable with an outside surface portion of the blade, the blade being constrained at the anvil between the first and second anvil portions for rotatable movement with the anvil with the blade being flexibly movable for engagement of the surface portion with some of the configured bearing areas upon the anvil being rotatably driven about the axis of rotation, the blade comprising a unitary structure constrained at mid-position at the anvil and extending in diametrically opposite directions from the anvil, the ends of the layers distal of the anvil being tighly secured to each other for preventing slidable movement between the layers at the ends, the anvil constraining the blade at mid-position in a controlled clamp for permitting slidable movement between he layers of the blade through the clamping area upon application of flexure forces to the blade.

* * * * *